US012008709B2

(12) United States Patent
Singla et al.

(10) Patent No.: US 12,008,709 B2
(45) Date of Patent: *Jun. 11, 2024

(54) SYSTEM FOR CREATING A CONTEXT FOR A VIRTUAL OBJECT

(71) Applicant: ADLOID TECHNOLOGIES PRIVATE LIMITED, New Delhi (IN)

(72) Inventors: Kanav Singla, Punjab (IN); Karthik Kanaujia, Haryana (IN)

(73) Assignee: ADLOID TECHNOLOGIES PRIVATE LIMITED, New Delhi (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,880

(22) Filed: Dec. 5, 2022

(65) Prior Publication Data

US 2023/0097834 A1    Mar. 30, 2023

Related U.S. Application Data

(63) Continuation of application No. 17/466,106, filed on Sep. 3, 2021, now Pat. No. 11,538,217.

(30) Foreign Application Priority Data

Jul. 8, 2021    (IN) .............................. 202111030777

(51) Int. Cl.
*G06T 15/50*    (2011.01)
*G06T 17/10*    (2006.01)
*G06T 19/00*    (2011.01)

(52) U.S. Cl.
CPC ............ *G06T 15/506* (2013.01); *G06T 17/10* (2013.01); *G06T 19/00* (2013.01)

(58) Field of Classification Search
CPC ....... G06T 15/506; G06T 17/00; G06T 17/10; G06T 19/00; G06T 19/006
See application file for complete search history.

(56) References Cited

U.S. PATENT DOCUMENTS

| 10,825,247 | B1* | 11/2020 | Vincent | G06T 17/05 |
| 2015/0063683 | A1* | 3/2015 | Fu | G06V 20/64 |
| | | | | 382/154 |
| 2020/0302681 | A1* | 9/2020 | Totty | G06T 7/74 |

OTHER PUBLICATIONS

Franz, Steffen, Robert Irmler, and Uwe Ruppel. "Real-time collaborative reconstruction of digital building models with mobile devices." Advanced Engineering Informatics 38 (2018): 569-580. (Year: 2018).*

* cited by examiner

*Primary Examiner* — Daniel F Hajnik
(74) *Attorney, Agent, or Firm* — Frank Gao, Esq.

(57) ABSTRACT

A system for creating a context for a virtual object is disclosed, comprising a processing unit, wherein the processing unit is configured to receive values of the one or more parameters from the input unit, create a three-dimensional textual matrix of sensor representation of a real environment world based on the one or more parameters, in real-time, wherein the processing unit create textual information that is reusable in the three-dimensional matrix, and create a context of a specific virtual object from one or more virtual objects with respect to the real-world environment based on the three-dimensional textual matrix, wherein the context of the specific virtual object is created based on the context of one or more other virtual objects.

14 Claims, 12 Drawing Sheets

Surfaces 302

Light 304

Motion 306

Environment 308

Space 310

Sound 312

Size 314

Direction of Light 316

Physics 318

402

404

302 304 306 308 310 312 314
316 318

406

A      B

408

410

412

522

524

526

528

530

532

542

544A

544B

546A

546B

SYSTEM FOR CREATING A CONTEXT FOR A VIRTUAL OBJECT

CROSS-REFERENCE TO RELATED APPLICATIONS

This application is a continuation application of the U.S. patent application Ser. No. 17/466,106 filed on Sep. 3, 2021, which claims priority to the Indian Patent Application No. 202111030777 filed Jul. 8, 2021, the entire contents of which are hereby incorporated by reference.

TECHNICAL FIELD

The present disclosure relates to the field of interactive virtual, augmented or mixed reality environments. More particularly, the present disclosure relates to systems and methods for viewing interplay between real-world elements and virtual objects (including interplay between various virtual objects themselves) of an augmented reality environment.

BACKGROUND

Augmented reality systems provide an interactive experience of a real-world environment where objects that reside in the real-world are altered by computer-generated perceptual information. Faster computer processors of modern computing devices have made it feasible to combine computer-generated information with real-time video captured using a camera. In recent years, augmented reality has become more pervasive among a wide range of applications including its use in gaming, education, business, repair and maintenance, navigation, entertainment, medicine, and hospitality and tourism, among others.

However, existing systems are generally based on including virtual objects (e.g. text, graphics, symbols, images, and the likes) in an image of a real-world location. These existing systems that merge the virtual objects with the real-world, are restricted to live viewing of limited virtual elements that can have limited interaction with the real-world elements, interaction with the other virtual elements, and interplay. There is therefore a need in the art for systems and methods that can facilitate simultaneous viewing and interaction of virtual elements in real-world environments that interplay with each other in real-world context, which overcomes above-mentioned and other limitations of existing approaches.

SUMMARY

This summary is provided to introduce simplified concepts of systems and methods disclosed herein, which are further described below in the Detailed Description. This summary is not intended to identify key or essential features of the claimed subject matter, nor is it intended for use in determining/limiting the scope of the claimed subject matter.

The present disclosure relates to the field of interactive virtual, augmented or mixed reality environments. More particularly, the present disclosure relates to systems and methods for viewing interplay between real-world elements and virtual objects (including interplay between various virtual objects themselves) of an augmented reality environment.

An aspect of the present disclosure provides a system implemented in a computing device for viewing interplay between one or more real-world elements and one or more virtual objects of an augmented reality environment. The system comprises an input unit comprising one or more sensors coupled with the computing device, wherein the one or more sensors capture one or more parameters of the one or more real-world elements of the augmented reality environment; a processing unit comprising a processor coupled with a memory, the memory storing instructions executable by the processor to: receiving values of the one or more parameters from the input unit and creating a three-dimensional textual matrix of sensor representation of a real environment world based on the one or more parameters; determining a context of a specific virtual object of the one or more virtual objects with respect to the real-world environment based on the three-dimensional textual matrix; and modelling the specific virtual object based on the context to place the specific virtual object in the augmented reality environment.

According to an embodiment, the one or more parameters include information pertaining to any or a combination of light, sound, surface, size, direction of light and physics of the one or more real-world elements.

According to an embodiment, the one or more sensors include any or a combination of an image sensor, a camera, an accelerometer, a sound sensor and a gyroscope.

According to an embodiment, the three-dimensional textual matrix includes information pertaining to any or a combination of space estimation, light estimation, sound estimation, surface estimation, environment estimation, size estimation, direction of light estimation, and physics estimation with respect to the one or more real-world elements.

According to an embodiment, the context of the specific virtual object is determined based on the context of one or more other virtual objects.

According to an embodiment, each virtual object of the one or more virtual objects is divided into a plurality of parts and subparts.

According to an embodiment, information of the three-dimensional textual matrix is reusable.

According to an embodiment, the processing unit creates a three-dimensional grid indicating spatial structuring of a user and user's environment.

According to an embodiment, the three-dimensional grid includes a plurality of cells, and information pertaining to each cell of the plurality of cells is saved in the three-dimensional textual matrix.

Another aspect of the present disclosure provides a method for viewing interplay between one or more real-world elements and one or more virtual objects of an augmented reality environment, carried out according to instructions saved in a computer device, comprising: receiving values of one or more parameters of the one or more real-world elements of the augmented reality environment, from an input unit, the input unit comprising one or more one or more sensors coupled with the computing device; creating a three-dimensional textual matrix of sensor representation of a real environment world based on the one or more parameters; determining a context of a specific virtual object of the one or more virtual objects with respect to the real-world environment based on the three-dimensional textual matrix; and modelling the specific virtual object based on the context to place the specific virtual object in the augmented reality environment.

Another aspect of the present disclosure provides a computer program product, comprising: a non-transitory computer readable storage medium comprising computer readable program code embodied in the medium that is executable by one or more processors of a computing device to view interplay between one or more real-world elements and one or more virtual objects of an augmented reality environment, wherein the one or more processors perform: receiving values of one or more parameters of the one or more real-world elements of the augmented reality environment, from an input unit, the input unit comprising one or more one or more sensors coupled with the computing device; creating a three-dimensional textual matrix of sensor representation of a real environment world based on the one or more parameters; determining a context of a specific virtual object of the one or more virtual objects with respect to the real-world environment based on the three-dimensional textual matrix; and modelling the specific virtual object based on the context to place said specific virtual object in the augmented reality environment.

Various objects, features, aspects and advantages of the present disclosure will become more apparent from the following detailed description of preferred embodiments, along with the accompanying drawing figures in which numerals represent like features.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1:
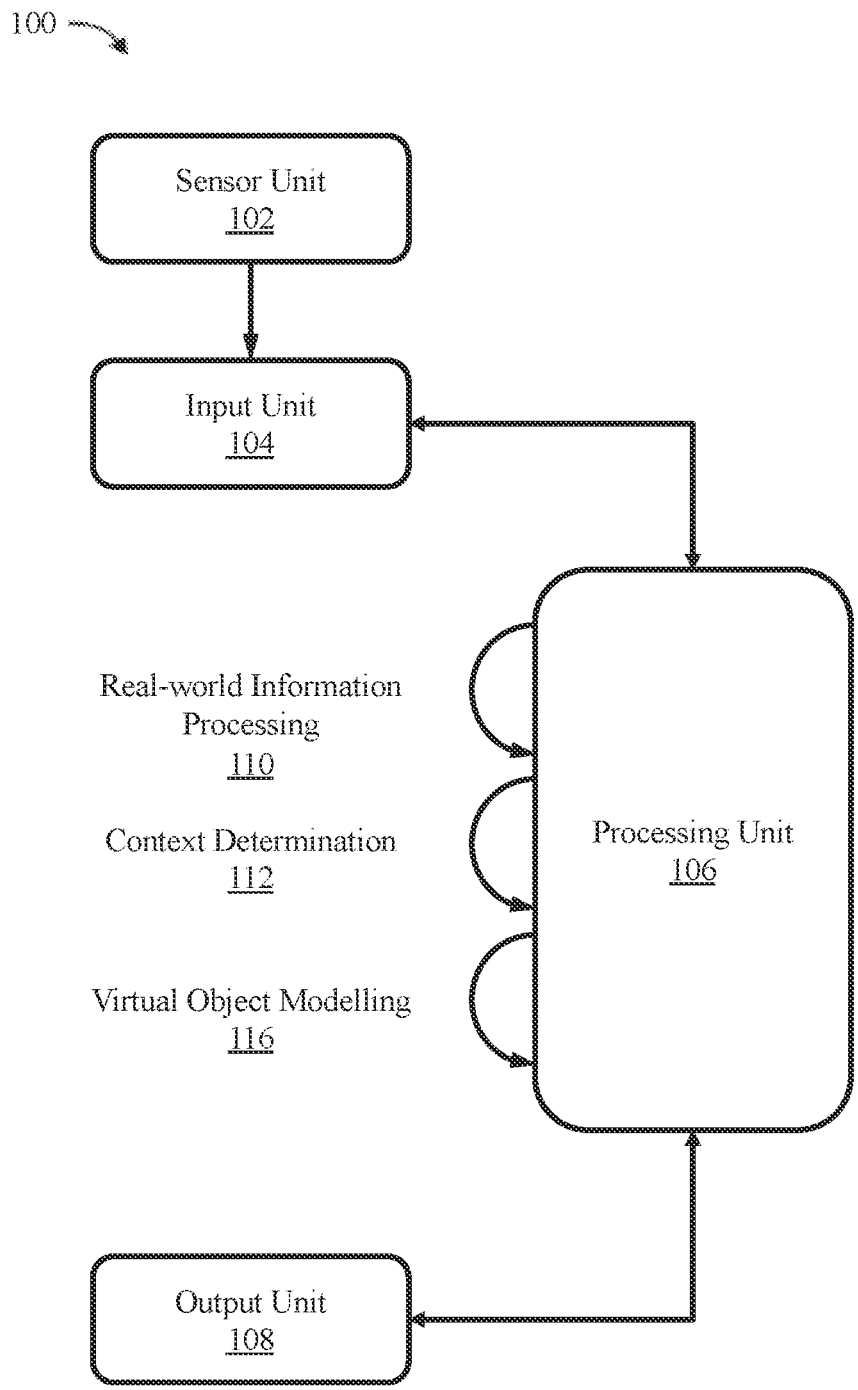
FIG. 1 illustrates architecture of an augmented reality system to illustrate its overall working in accordance with an embodiment of the present disclosure.

In the following description, numerous specific details are set forth in order to provide a thorough understanding of embodiments of the present invention. It will be apparent to one skilled in the art that embodiments of the present invention maybe practiced without some of these specific details.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

As used in the description herein and throughout the claims that follow, the meaning of "a," "an," and "the" includes plural reference unless the context clearly dictates otherwise. Also, as used in the description herein, the meaning of "in" includes"in" and "on" unless the context clearly dictates otherwise.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be saved and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various terms as used herein are shown below. To the extent a term used in a claim is not defined below, it should be given the broadest definition persons in the pertinent art have given that term as reflected in printed publications and issued patents at the time of filing.

The present disclosure relates to the field of interactive virtual, augmented or mixed reality environments. More particularly, the present disclosure relates to systems and methods for viewing interplay between real-world elements and virtual elements (including interplay between various virtual objects themselves) of an augmented reality environment.

An aspect of the present disclosure provides a system implemented in a computing device for viewing interplay between one or more real-world elements and one or more virtual objects of an augmented reality environment. The system comprises an input unit comprising one or more sensors coupled with the computing device, wherein the one or more sensors capture one or more parameters of the one or more real-world elements of the augmented reality environment; a processing unit comprising a processor coupled with a memory, the memory storing instructions executable by the processor to: receiving values of the one or more parameters from the input unit and creating a three-dimensional textual matrix of sensor representation of a real environment world based on the one or more parameters; determining a context of a specific virtual object of the one or more virtual objects with respect to the real-world environment based on the three-dimensional textual matrix; and modelling the specific virtual object based on the context to place the specific virtual object in the augmented reality environment.

According to an embodiment, the one or more parameters include information pertaining to any or a combination of light, sound, surface, size, direction of light and physics of the one or more real-world elements.

According to an embodiment, the one or more sensors include any or a combination of an image sensor, a camera, an accelerometer, a sound sensor and a gyroscope.

According to an embodiment, the three-dimensional textual matrix includes information pertaining to any or a combination of space estimation, light estimation, sound estimation, surface estimation, environment estimation, size estimation, direction of light estimation, and physics estimation with respect to the one or more real-world elements.

According to an embodiment, the context of the specific virtual object is determined based on the context of one or more other virtual objects.

According to an embodiment, each virtual object of the one or more virtual objects is divided into a plurality of parts and subparts.

According to an embodiment, information of the three-dimensional textual matrix is reusable.

According to an embodiment, the processing unit creates a three-dimensional grid indicating spatial structuring of a user.

According to an embodiment, the three-dimensional grid includes a plurality of cells, and wherein information pertaining to each cell of the plurality of cells is saved in the three-dimensional textual matrix.

Another aspect of the present disclosure provides a method for viewing interplay between one or more real-world elements and one or more virtual objects of an augmented reality environment, carried out according to instructions saved in a computer device, comprising: receiving values of one or more parameters of the one or more real-world elements of the augmented reality environment, from the input unit, the input unit comprising one or more one or more sensors coupled with the computing device; creating a three-dimensional textual matrix of sensor representation of a real environment world based on the one or more parameters; determining a context of a specific virtual object of the one or more virtual objects with respect to the real-world environment based on the three-dimensional textual matrix; and modelling the specific virtual object based on the context to place the specific virtual object in the augmented reality environment.

Another aspect of the present disclosure provides a computer program product, comprising: a non-transitory computer readable storage medium comprising computer readable program code embodied in the medium that is executable by one or more processors of a computing device to view interplay between one or more real-world elements and one or more virtual objects of an augmented reality environment, wherein the one or more processors perform: receiving values of one or more parameters of the one or more real-world elements of the augmented reality environment, from an input unit, the input unit comprising one or more one or more sensors coupled with the computing device; creating a three-dimensional textual matrix of sensor representation of a real environment world based on the one or more parameters; determining a context of a specific virtual object of the one or more virtual objects with respect to the real-world environment based on the three-dimensional textual matrix; and modelling the specific virtual object based on the context to place said specific virtual object in the augmented reality environment.

Embodiments of the present disclosure aim to provide an augmented reality system that incorporates a combination of real and virtual worlds, real-time interaction, and accurate three-dimensional registration of virtual and real objects. Various embodiments disclose augmenting and interacting with a number of products in real-time using a camera-based computing device through a system incorporating various sensors and functionalities. A contextual three-dimensional (3D) environment and a 3D matrix map is created at runtime using camera input, real-world input, and virtual input. Each virtual object can be independently modelled, textured, loaded and compressed as a unique 3D model format, where each virtual object can interplay (materials, vertices, faces, and animations are shared whenever required/optimal) with each other and the real-world objects. The virtual objects can also interact with the real world because of real-world detection through sensory data (e.g. light, sound, textures, reflections, wind, weather, daytime, physics, motion, etc). Interactions and interplay is made possible using a Graphical User Interface and first-person navigation (e.g. device position, orientation, pose, etc).

FIG. 1 illustrates architecture of an augmented reality system 100 to illustrate its overall working in accordance with an embodiment of the present disclosure.

According to an embodiment, an augmented reality system 100 (interchangeably referred to as system 100, hereinafter) is implemented in a computing device. The system 100 comprises an input unit 104, a processing unit 106 and an output unit 108. The input unit 104 may comprise one or more pre-processors, which processes perception inputs, raw sensed inputs from sensors of a sensor unit 102 coupled with the system 100 including, but not limited to, an image sensor, a camera, an accelerometer, a gyroscope, and the like. The pre-processed sensed inputs may comprise parameters of elements in real-world environments including information pertaining to light, sound, surface, size, direction of light, physics, etc. of the real-world elements.

According to an embodiment, the processing unit 106 may comprise a processor and a memory and/or may be integrated with existing systems and controls of the computing device. For instance, signals generated by the processing unit 106 may be sent to an output unit 108 or a Graphical User Interface (GUI) or a display unit of the computing device. The output unit 108 may also be a display device or any other audio-visual device.

According to an embodiment, during real-world information processing 110, the processing unit 106 receives values of the parameters from the input unit 102 and creates a 3D textual matrix of sensor representation of a real environment world based on the parameters. The parameters can include information pertaining to information pertaining to any or a combination of light, sound, surface, size, direction of light, physics, and the like of the real-world elements such that the 3D textual matrix includes information pertaining to any or a combination of space estimation, light estimation, sound estimation, surface estimation, environment estimation, size estimation, direction of light estimation, physics estimation and the like with respect to the real-world elements. In an implementation, information of the 3D textual matrix can be reused. The processing unit 106 can create a 3D grid indicating spatial structuring of a user and user's environment such that the 3D grid includes a plurality of cells, and information pertaining to each cell can be saved in the 3D textual matrix.

According to an embodiment, during context determination 112, the processing unit 106 determines a context of a specific virtual object with respect to the real-world environment based on the 3D textual matrix. Additionally, the context of the specific virtual object can be determined based on the context of other virtual objects.

According to an embodiment, during virtual object modelling 116, the processing unit 106 models the specific virtual object based on the context to place the specific virtual object in the augmented reality environment. For effective modelling, each virtual object can be divided into a plurality of parts and subparts.

Figure 2:
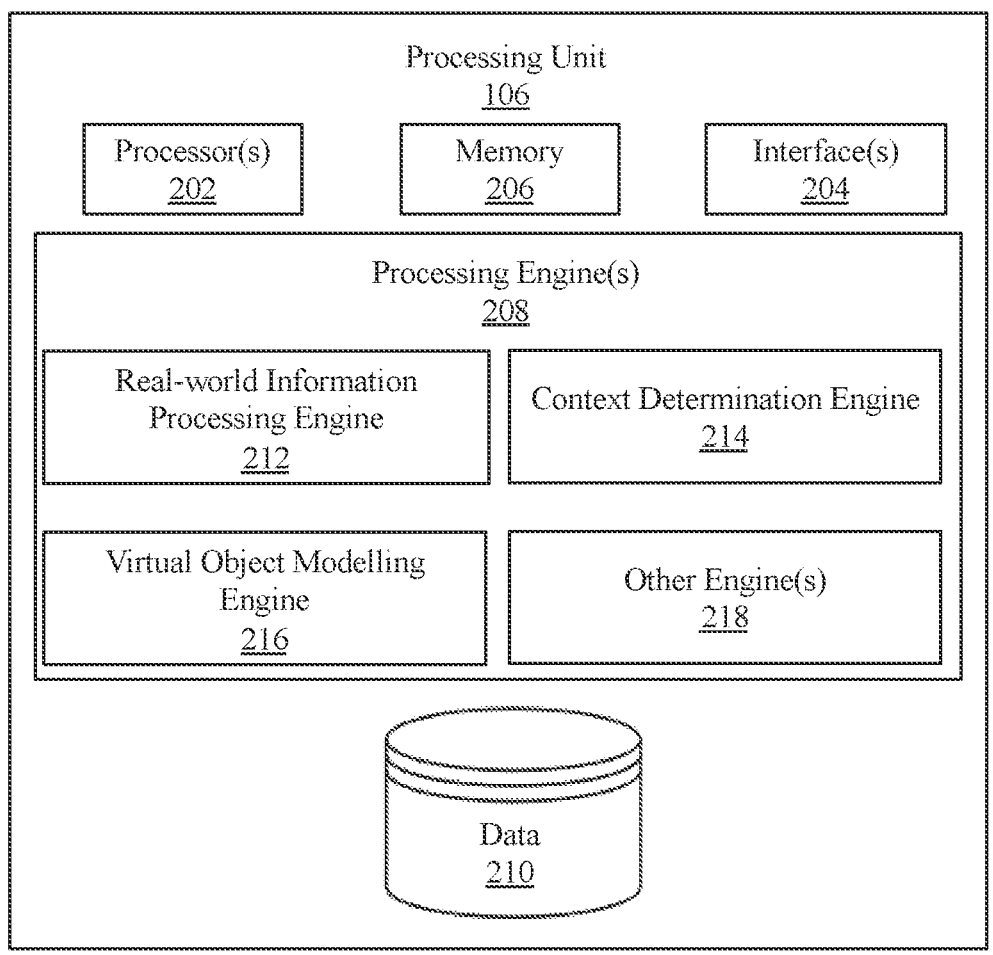
FIG. 2 illustrates exemplary functional components of a processing unit 106 in accordance with an embodiment of the present disclosure.

FIG. 2 illustrates exemplary functional components of a processing unit 106 in accordance with an embodiment of the present disclosure.

In an aspect, the processing unit 106 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions saved in a memory 206 of the processing unit 106. The memory 206 may store one or more computer-readable instructions or routines, which may be fetched and executed to create or share the data units over a network service. The memory 206 may comprise any non-transitory storage device including, for example, volatile memory such as RAM, or non-volatile memory such as EPROM, flash memory, and the like.

The processing unit 106 may also comprise an interface(s) 204. The interface(s) 204 may comprise a variety of interfaces, for example, interfaces for data input and output devices, referred to as I/O devices, storage devices, and the like. The interface(s) 204 may facilitate communication of processing unit 106 with various devices coupled to the processing unit 106 such as the input unit 104 and the output unit 108. The interface(s) 204 may also provide a communication pathway for one or more components of the processing unit 106. Examples of such components include, but are not limited to, processing engine(s) 208 and data 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways.

For example, the programming for the processing engine(s) 208 may be processor executable instructions saved on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the processing unit 106 may comprise the machine-readable storage medium storing the instructions and the processing resource to execute the instructions, or the machine-readable storage medium may be separate but accessible to the processing unit 106 and the processing resource. In other examples, the processing engine(s) 208 may be implemented by electronic circuitry.

The database 210 may comprise data that is either saved or generated as a result of functionalities implemented by any of the components of the processing engine(s) 208.

In an exemplary embodiment, the processing engine(s) 208 may comprise a real-world information processing engine 212, context determination engine 214, a virtual object modelling engine 216, and other engine(s) 218.

It would be appreciated that engines being described are only exemplary engines and any other engines or sub-engines may be included as part of the system 100 or the processing unit 106. These engines too may be merged or divided into super-engines or sub-engines as may be configured.

In an aspect, one or more pre-processors of an input unit operatively coupled with the processing unit 106 may perform pre-processing of raw data captured by the sensor unit 102 to receive input signals by real-world information processing engine 212.

Real-World Information Processing Engine 212

According to an embodiment, the real-world information processing engine 212 receives values of the parameters from the input unit and creates a 3D textual matrix of sensor representation of a real environment world based on the parameters. The real-world information processing engine 212 creates the 3D matrix in real-time. Those skilled in the art would appreciate that unlike the existing methodologies, the real-world information processing engine 212 creates the 3D textual matrix of sensor representation of the real world, rather than reconstructing the real world in plane 3D format. The created 3D matrix is in a textual format and created using inputs received from various sensors of the input unit (e.g., camera, accelerometer, gyroscope, etc.). An exemplary technique for determination of the textual information is described below with reference to FIG. 3.

Those skilled in the art would further appreciate that embodiments of the present invention aim to enable creating a context for virtual objects and rendering augmented reality experience faster, without any frame drop. Therefore, the real-world information processing engine 212 can create textual information that is reusable in the three-dimensional matrix in such a way where if a user holding or wearing the computing device (incorporating a camera and the processing unit 106) traverses in real world, the real-world information processing engine 212 maps sensor information in each cell (e.g. as camera moves from one cell to another). If the user revisits a cell or remains in one, no sensor data needs to be processed by the real-world information processing engine 212. Therefore, only when the user moves from one cell to another unvisited cell in the three-dimensional matrix, the sensor representation of the real world is re-created in the context by storing textual data in the matrix.

Thereby, the processing capacity of the device is improved, which enables the device to show much higher fidelity content in augmented reality environment. Also, since the data is saved in textual format, rather than 3D digital format, storage requirement of the system is also minimized. Those skilled in the art would appreciate that, storing data in text format rather than 3D format helps in keeping storage space free. Hence, read-write processes utilize less bandwidth, thereby, keeping the system free from clogging. Further, ability to reuse previously collected data leads to the sensor data not be collected for every frame. An exemplary technique for reusing the textual information is described below with reference to FIG. 6.

Context Determination Engine 214

According to an embodiment, the context determination engine 214 determines a context of a specific virtual object selected from various virtual objects. The specific virtual object can be selected from a library of virtual objects maintained in database 210. The context of the specific virtual object is determined with respect to the real-world environment based on the 3D textual matrix. Those skilled in the art would appreciate that the context of the specific virtual object is determined to bring meaning to an otherwise meaningless augmented reality environment (also referred to as virtual world, hereinafter). The camera or an image sensor captures a real-world scene to view the real world on the computing device. Additionally, the context determination engine 214 determines various factors such as surfaces, textures, light, geometries, sounds and the like. Based on the factors, each data point in the real-world scene can be treated differently and can be used to place virtual elements in "context".

Virtual Object Modelling Engine 216

According to an embodiment, each virtual object saved in the database 210 can be divided into a plurality of virtual parts and sub-parts. For example, if the virtual object is a car, the car can be divided into parts such as wheels, roof, bonnet, tailgate, doors, lights and car body. These parts can further be divided into sub-parts, e.g. a wheel can be divided into rim, tyre and disk-brake, a roof can be divided into body and sunroof, where the body can further be divided into plastic, metal and chrome. Each virtual part or sub-part can be independently modelled, textured, compressed, and loaded as an independent virtual unit. The virtual object modelling engine 216 models the specific virtual object based on the context to place the specific virtual object in the augmented reality environment. In an example, every virtual object (or parts or sub-parts) can behave like a real-world element once the object is placed in the augmented reality environment. All further virtual objects can use the object to determine new respective context for placement in the augmented reality environment.

Those skilled in the art would appreciate that as the context of all virtual parts or sub-parts of the virtual object can be different and inter-dependent, the context determination engine 214 along with the virtual object modelling engine 216 can enable the virtual parts or sub-parts to interplay with each other and the real-world environment. Moreover, such interplay can also be facilitated if more than one virtual object is present. The context can be calculated considering the placement and augmentation of multiple virtual objects, as the context is not only considered from the real world, but is also calculated based on the presence of multiple virtual objects in the scene. Therefore, embodiments of the present disclosure provide a platform-independent contextual real-time augmented reality system that enables interaction and interplay between real-world and virtual elements (including interplay between various virtual objects themselves). Exemplary effects of determination of context and modelling of virtual objects is described below with reference to FIG. 4 and FIGS. 5A-C.

Those skilled in the art would appreciate that embodiments of the present disclosure enable independent modelling of virtual objects or their parts or sub-parts, where virtual objects are broken into parts and subparts and saved in the database 210 separately. Therefore, there is an opportunity to download and load the virtual objects, parts or sub-parts, of the model according to the requirement. Storage of information of the virtual object in such disintegrated manner can help to reduce loading time by reducing need to download complete object at once. These virtual objects can follow a specific hierarchy, which can also help in modularity within each virtual object.

Figure 3:
FIG. 3 illustrates exemplary representations of determination of textual information of the three-dimensional matrix in accordance with an embodiment of the present disclosure.
Figure 3:
Figure 3:
Figure 3:
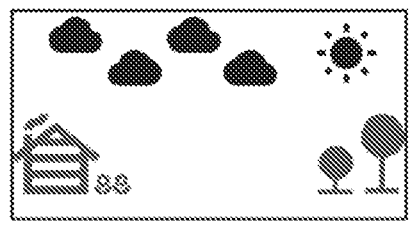
Figure 3:
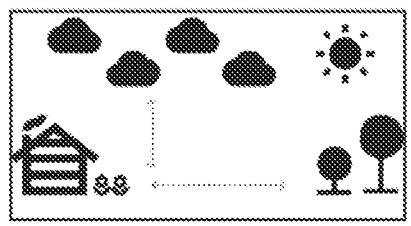
Figure 3:
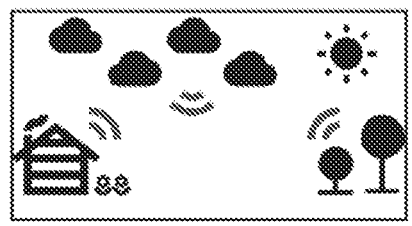
Figure 3:
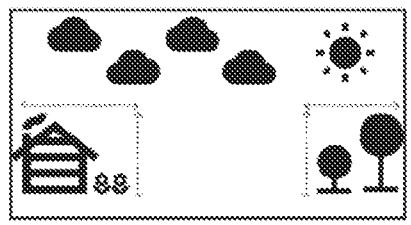
Figure 3:
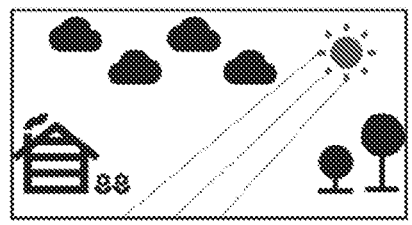
Figure 3:
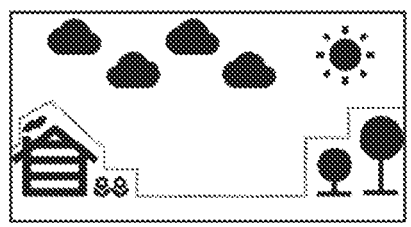

FIG. 3 illustrates exemplary representations of determination of textual information of the three-dimensional matrix in accordance with an embodiment of the present disclosure.

Referring to FIG. 3, in an example, the textual information can contain contextual information of the real-world environment such as surface estimation 302, light estimation 304, motion estimation 306, environment estimation 308, space estimation 310, sound estimation 312, size estimation 314, direction of light estimation 316 and physics estimation 318. During surface estimation 302, the system 100 can determine surfaces such as floor (horizontal), ceramic walls (vertical), metal surface of car (horizontal and vertical), etc. Surfaces can also refer to horizontal, vertical or tilted planar information of the real world. During light estimation 304, the system 102 can determine light luminosity (e.g. 3.846× 1026 watts). Light information can refer to luminosity, intensity, colour, spread, radius, perimeter, area, density, scattering, shadows, etc. of the real world. During motion estimation 306, the system 100 can determine vectors for each element in the real world or virtual world. Motion can also refer to velocity, displacement, acceleration, height, rotation, frame of reference, etc. pertaining to the computing device. During environment estimation 308, the system 100 can determine environment/time of the day e.g. beach (midday), city (Mid-day), mountains (morning), etc. Environment can detect surroundings of the real-world including objects, weather, time of day, tint, geography, etc. During space estimation 310, the system 100 can determine sub-section of a grid in the augmented reality where there is no existence of real-world and virtual world objects. During sound estimation 312, the system 100 determines sound sources in real world and virtual world. Space can be calculated of available area taking into account real world and virtual world elements in all three axes. During size estimation 314, the system 100 determines sizes (e.g. length, breadth and height) for all real world and virtual world elements. During direction of light estimation 316, the system 100 can determine three-dimensional rotational values for every light source along with direction and propagation of sources of light. During physics estimation 318, the system 100 can determine buoyancy of each surface of real world and virtual world objects.

Figure 4:
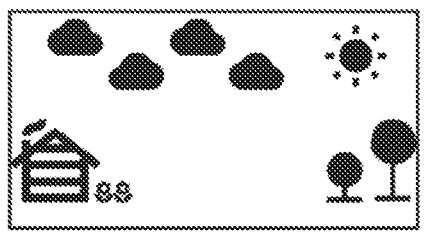
FIG. 4 illustrates exemplary representations of working of the augmented reality system in accordance with an embodiment of the present disclosure.
Figure 4:
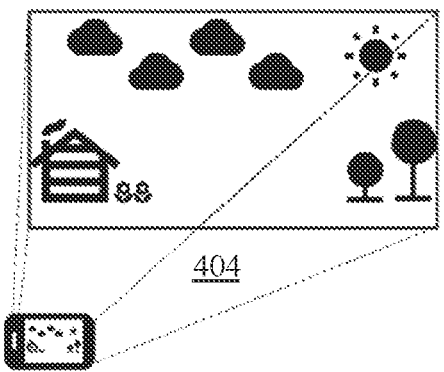
Figure 4:
Figure 4:
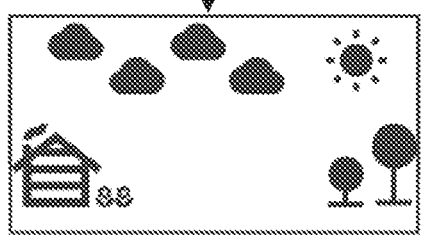
Figure 4:
Figure 4:
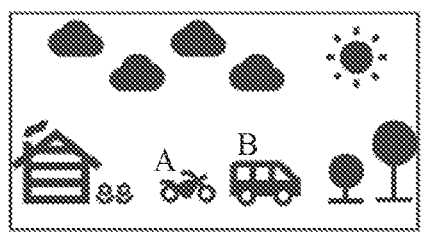
Figure 4:
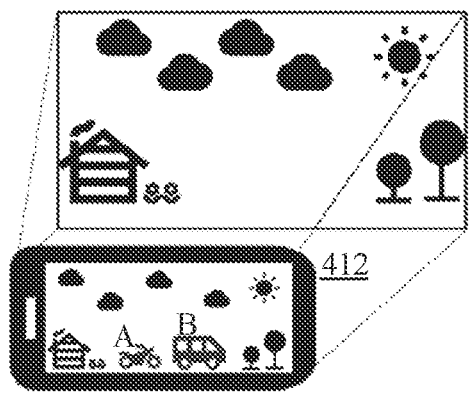

FIG. 4 illustrates exemplary representations of working of the augmented reality system in accordance with an embodiment of the present disclosure.

According to an example, representation 402 illustrates a real-world that is visible to a user. Representation 404 illustrates capturing of the real-world scene (e.g. camera feed) through image sensor/camera of a computing (e.g. mobile) device. Representation 406 illustrates the determination of various parameters of the real-world to perform various estimations, e.g. surface estimation 302, light estimation 304, motion estimation 306, environment estimation 308, space estimation 310, sound estimation 312, size estimation 314, direction of light estimation 316 and physics estimation 318. Representation 408 illustrates virtual elements A and B that are required to be placed in an augmented reality environment in the computing device. Representation 410 illustrates modelling and placement of the virtual elements A and B along with real world elements in the augmented reality environment and representation 412 illustrated the integration of the augmented reality environment with the camera feed.

Figure 5A:
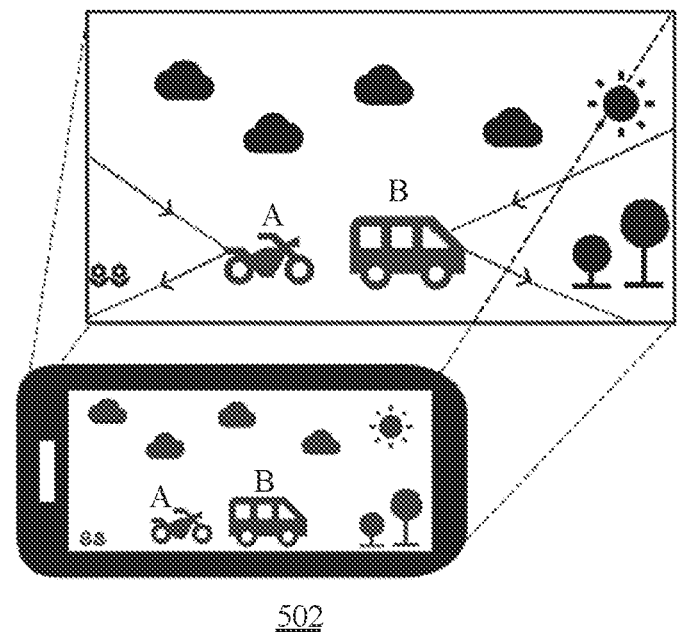
FIGS. 5A-C illustrate exemplary representations indicating an effect of change in parameters on the augmented reality environment in accordance with an embodiment of the present disclosure.
Figure 5A:
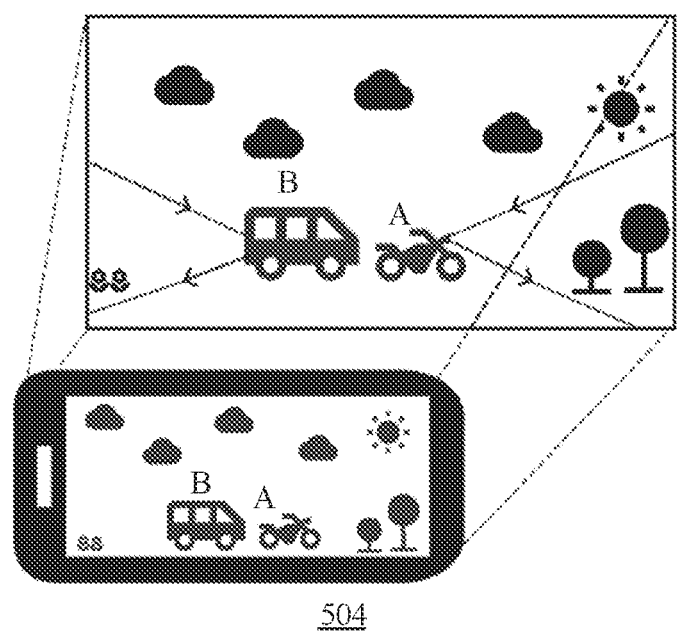
Figure 5B:
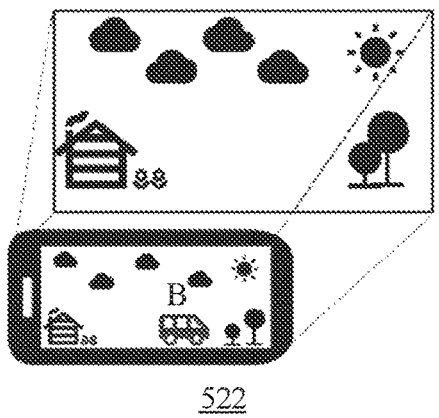
Figure 5B:
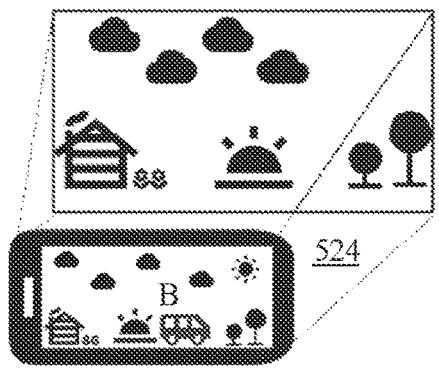
Figure 5B:
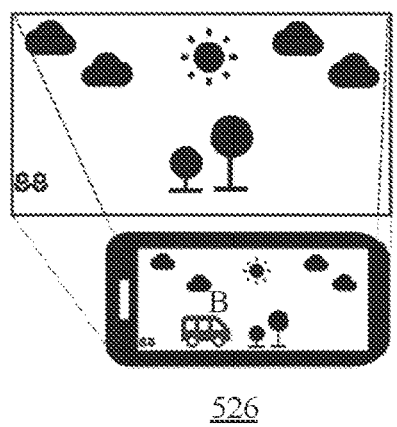
Figure 5B:
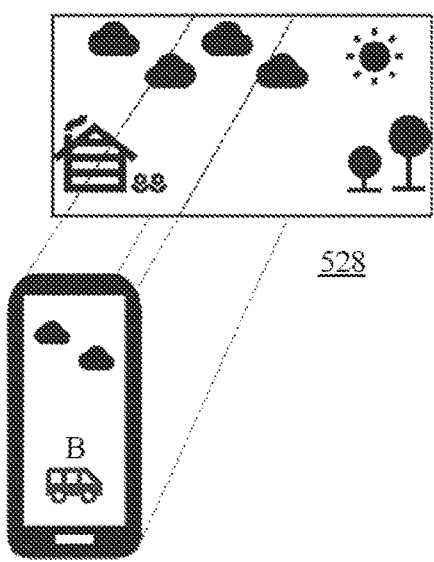
Figure 5B:
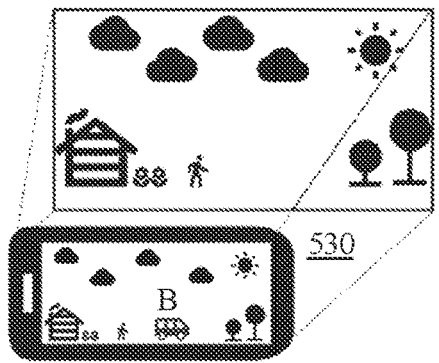
Figure 5B:
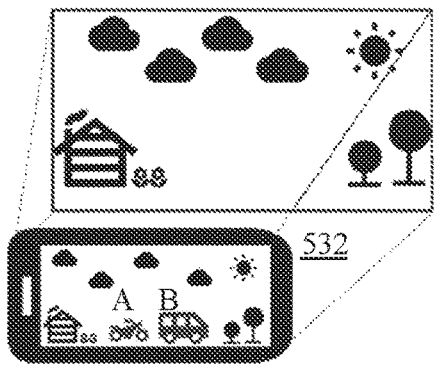
Figure 5C:
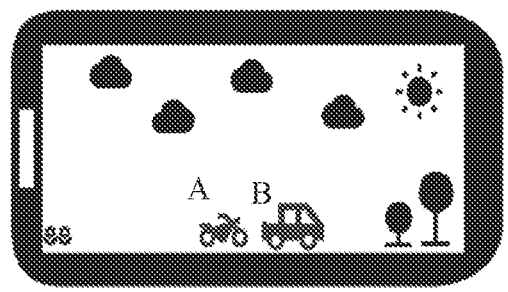
Figure 5C:
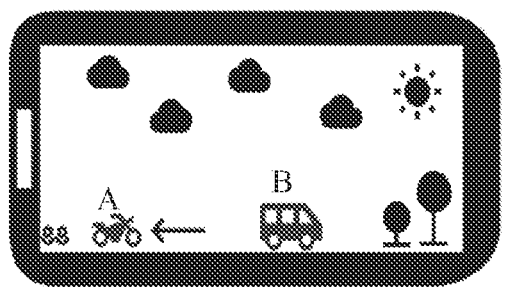
Figure 5C:
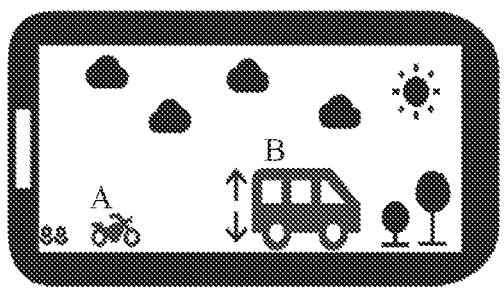
Figure 5C:
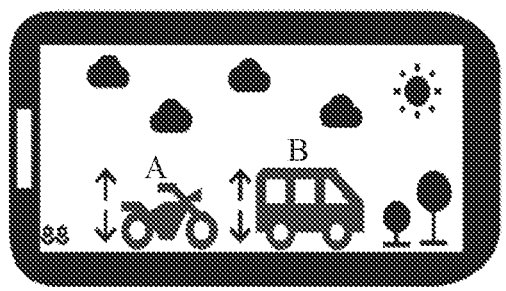
Figure 5C:
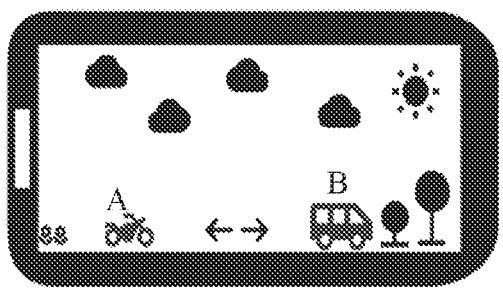

FIGS. 5A-C illustrate exemplary representations indicating an effect of change in parameters on the augmented reality environment in accordance with an embodiment of the present disclosure.

Various embodiments of the present disclosure provide ability of two virtual elements (e.g. A and B) to affect each other for modelling and placement in the augmented reality environment to be presented on a computing device. According to an example, the interplay can exist in the form of (i) reflections and (ii) surfaces.

In context of (i) reflections, virtual elements A and B upon changing locations can affect parameters of each other and respective reflections. Referring to FIG. 5A, as illustrated in representation 502, reflections can be calculated independently for each A and B. The car, B, can be reflecting the trees of real world, from the front and bike, A, from the back. The bike, A, can have independent reflection calculations based on flowers, of the real world from the back, and the car, B, from the front. According to representation 504, the positions of A and B are swapped and thus, the reflections can be re-calculated for both A and B. Those skilled in the art would appreciate that three-dimensional cube maps can be calculated by taking six directions from the centre of an object and mapping out the various visible virtual world and real-world objects. For each virtual element, the calculations can be returned as discrete images, which can be mapped to a cube that can then be applied as a reflection map on shaders.

In context of (ii) surfaces, each virtual element can be assigned a set of surfaces the virtual element can reside upon and also surfaces the virtual element contains. For example, a bike, A, can reside upon a floor. Since the system can detect surfaces in the real-world environment, the system can restrict the placement of the bike, A, on the floor. If a user tries to place the bike, A, on top of the car, B, the system will not allow the placement of the bike, A, simply because surface of the car, B, can be also determined to be a metallic car surface. However, if the virtual element was a table instead of a car, B, the table can be placed only on the floor. Now, considering another virtual element i.e. a lamp, the lamp can be placed a lamp on the floor and also on the table because interplay between a table surface and the lamp exists. Therefore, those skilled in the art would appreciate that the assignment for which surface a virtual element can interact with can be done by detecting category of the virtual element and further detecting the type of real-world object through image detection/object detection. However, in some cases, where virtual world objects are a part of a database, the surface information can also reside in the database.

Those skilled in the are would appreciate that embodiments of the present disclosure enable all calculations to be performed in real-time in the computing device itself. The system can perform the calculations based on input received from sensors of the computing device i.e. data can be collected from real-world environment can be understood and brought into context. Real-time can also signify that any change in augmentation of the virtual elements corresponding to the change in the virtual scene or change corresponding to the device's input can happen within a short time (e.g. 50 milliseconds) so that the user cannot perceive any lag and can interact with the augmented world smoothly.

According to an example, referring to FIG. 5B, representation 522 illustrates an augmented reality environment with real elements and a virtual element B, which can be considered as a sample output. Representation 524 is another illustration of the augmented reality environment, where addition of light in the real world changed metadata for virtual element VE2. Representation 526 is another illustration of the augmented reality environment, where camera feed and real-world parameters has changed by translation, which in turn also changes reflections and lighting metadata required for virtual element B. Representation 528 is another illustration of the augmented reality environment, where change in orientation of the computing device leads to change in visible real world in the camera feed. Representation 530 is another illustration of the augmented reality environment, where any change in the environment causes change in reflection (light) and surface metadata. Representation 532 is another illustration of the augmented reality environment, where addition of a virtual element A also leads to determination of new environment and calculation of new parameters.

Referring to FIG. 5C, representation 542 illustrates an augmented reality environment with real elements and two virtual elements A and B, which can be considered as a sample output. Representations 544A and 544B illustrate independent change in properties of virtual elements A and B while representations 546A and 546B illustrate change in multiple properties of the two virtual elements A and B occur simultaneously.

Therefore, in light of representations of FIGS. 5A-C, those skilled in the art would appreciate that embodiments of the present disclosure lead to an accurate context being created for placement and modelling of the virtual elements in augmented reality environment in the computing device.

Figure 6:
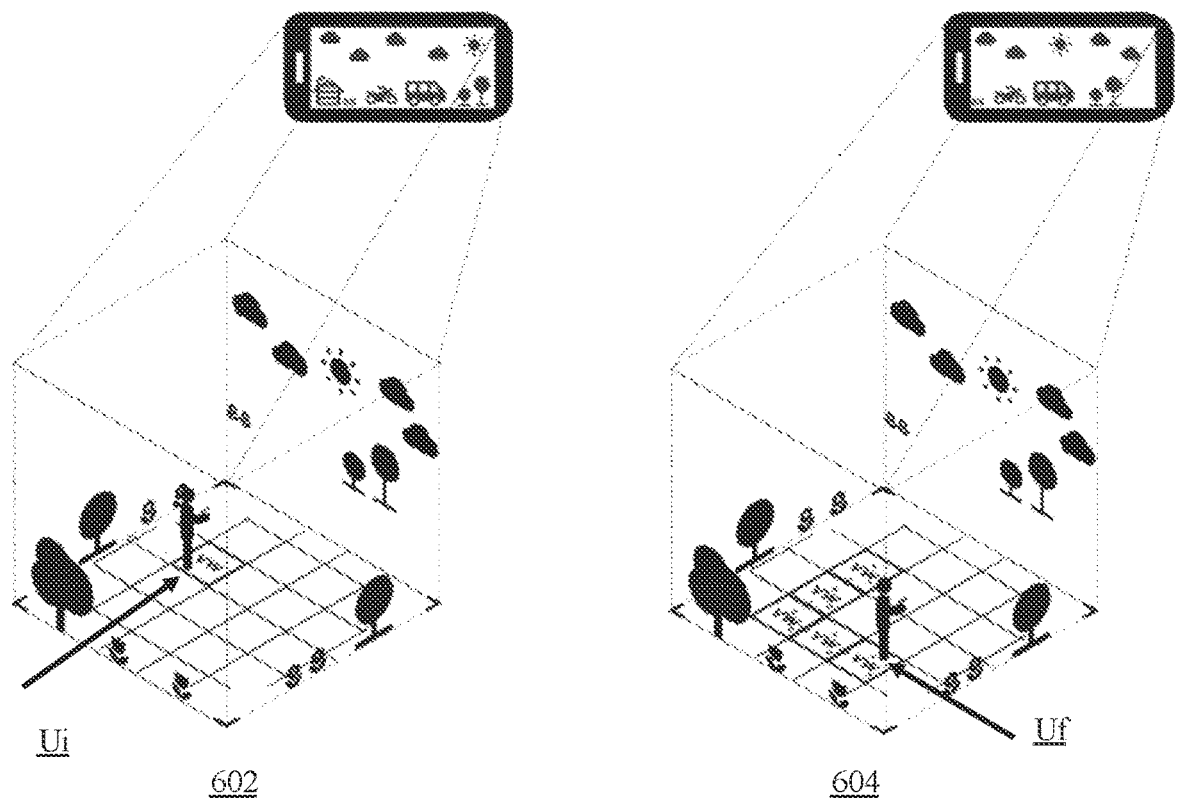
FIG. 6 illustrates formation of a three-dimensional grid in accordance with an embodiment of the present disclosure.
Figure 6:
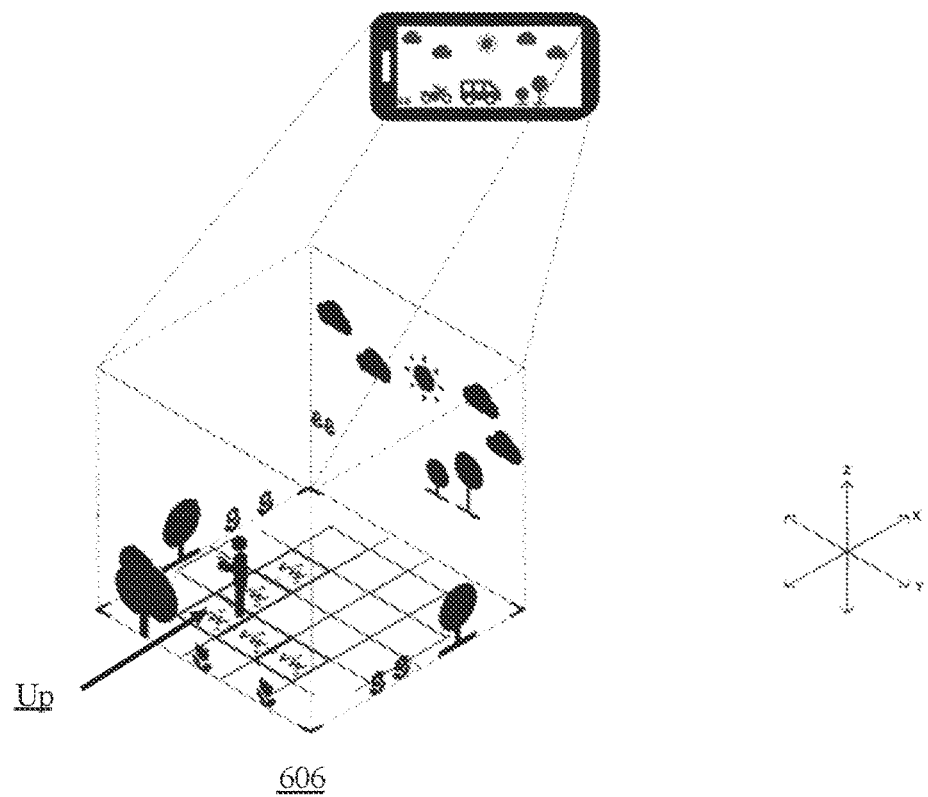

FIG. 6 illustrates formation of a three-dimensional grid in accordance with an embodiment of the present disclosure.

According to an embodiment, the system 100 creates a three-dimensional (3D) grid i.e. a spatial structuring of the real world of the user and user's environment. The 3D grid can be created in X, Y, Z-axis, where each unit is a cell such that information of each cell can be saved in the 3D textual matrix. The grid can be bounded by detected volume in the real-world environment, where larger the area, greater can be size of the 3D grid. Each cell in the grid can be bounded by least count of the sensors in the computing device. In one example:

Minimum possible cell side=½*(Least count of the accelerometer)*(1/$f$)*(1/$f$), where, $f$ is frequency of accelerometer inputs Therefore, smallest possible cell, where parameters (e.g. surface, motion, light, camera feed and environment) are constant, under three conditions:
  (i) Camera orientation is kept constant
  (ii) Virtual Elements are kept constant
  (iii) Real-world inputs are kept constant A cell of the grid can hold all the metadata pertaining to augmented reality environment to create the 3D grid. The purpose of such metadata comes to light when the user travels between cells. Referring to representations 602, 604 and 606 of FIG. 6, a path of a user in XYZ coordinate system can be noted. Initially, the user is at cell U1, therefore, all the parameters can be calculated with respect to cell U1 and the textual data can be saved in a 3D matrix. The system can perform these calculations only once and not in every frame. When the user then moves to next cell, all metadata calculations can be done pertaining to the new cell and saved in the 3D matrix. Similarly, considering final destination of the user in cell Uf, all metadata calculations can be in each newly visited cell and the data can be saved in the 3D matrix. In an example, 3D matrix size can be calculated as:

3D matrix size=Available ram/meta data in one cell

Once the data is saved with respect to various cells, if the user again arrives at a previously visited cell (e.g. Up), the system may not perform the calculations again and neither do calculations need to happen every frame. The 3D matrix can be searched for the particular cell, and the saved metadata can be reused. Therefore, for faster implementation the virtual world again may not be required to be created.

Figure 7:
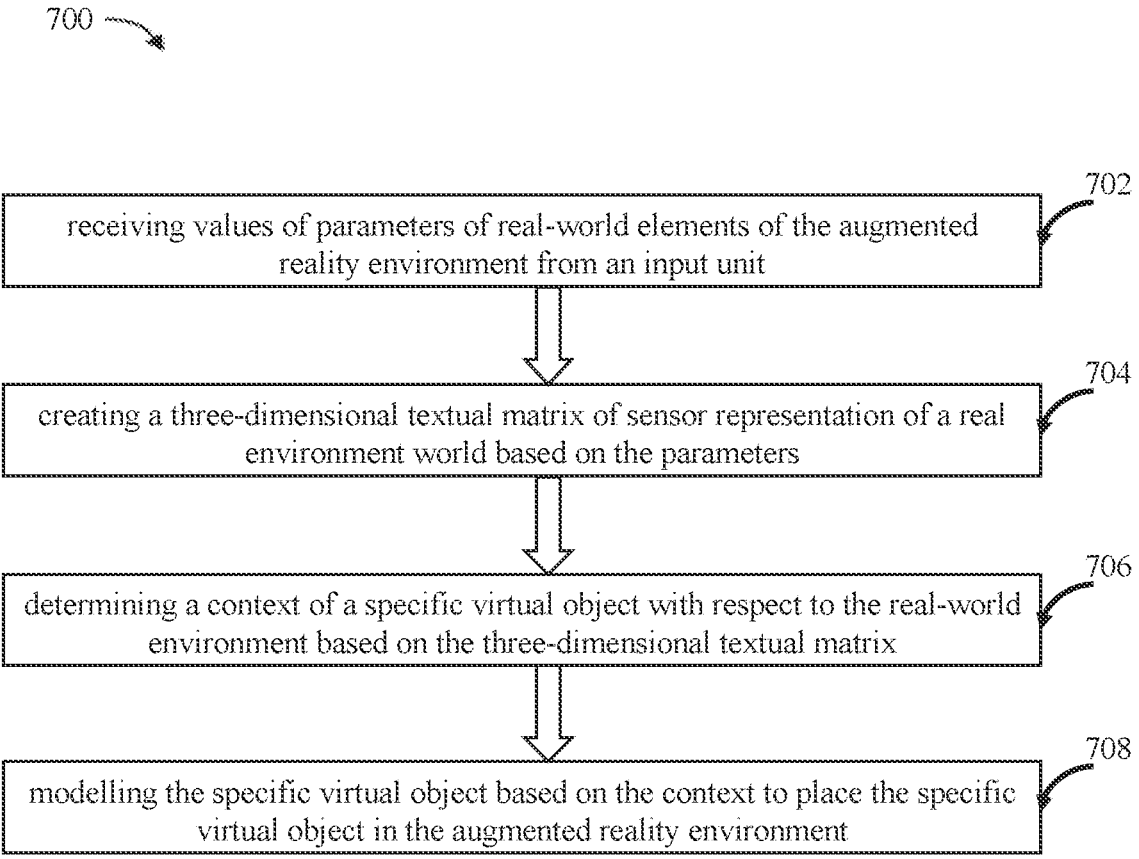
FIG. 7 is a flow diagram illustrating a method for viewing interplay between real-world elements and virtual objects of an augmented reality environment in accordance with an embodiment of the present disclosure.

FIG. 7 is a flow diagram 700 illustrating a method for viewing interplay between real-world elements and virtual objects of an augmented reality environment in accordance with an embodiment of the present disclosure.

In an aspect, the proposed method may be described in general context of computer executable instructions. Generally, computer executable instructions can include routines, programs, objects, components, data structures, procedures, modules, functions, etc., that perform particular functions or implement particular abstract data types. The method can also be practiced in a distributed computing environment where functions are performed by remote processing devices that are linked through a communications network. In a distributed computing environment, computer executable instructions may be located in both local and remote computer storage media, including memory storage devices.

The order in which the method as described is not intended to be construed as a limitation, and any number of the described method blocks may be combined in any order to implement the method or alternate methods. Additionally, individual blocks may be deleted from the method without departing from the spirit and scope of the subject matter described herein. Furthermore, the method may be implemented in any suitable hardware, software, firmware, or combination thereof. However, for ease of explanation, in the embodiments described below, the method may be considered to be implemented in the above described system.

In an aspect, present disclosure elaborates upon a method for viewing interplay between real-world elements and virtual objects of an augmented reality environment, carried out according to instructions saved in a computer device. The method comprises, at block 702, receiving values of one or more parameters of one or more real-world elements of the augmented reality environment, from the input unit, the input unit comprising one or more one or more sensors coupled with the computing device. The method comprises at block 704, creating a 3D textual matrix of sensor representation of a real environment world based on the one or more parameters. The method further comprises at block 706, determining a context of a specific virtual object of the one or more virtual objects with respect to the real-world environment based on the 3D textual matrix, and at block 708, modelling the specific virtual object based on the context to place said specific virtual object in the augmented reality environment.

Figure 8A:
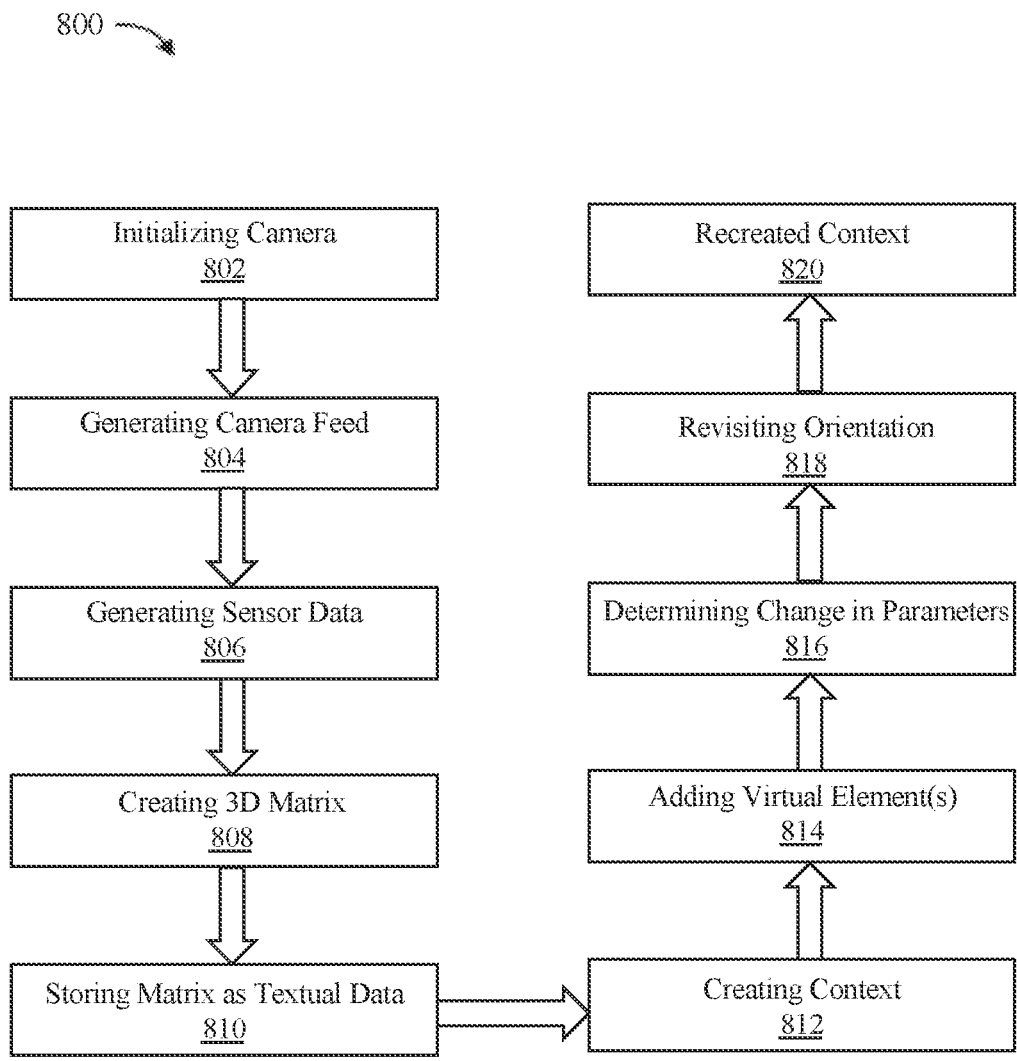
FIGS. 8A-B are flow diagrams illustrating exemplary working of the augmented reality system in accordance with an embodiment of the present disclosure.
Figure 8B:
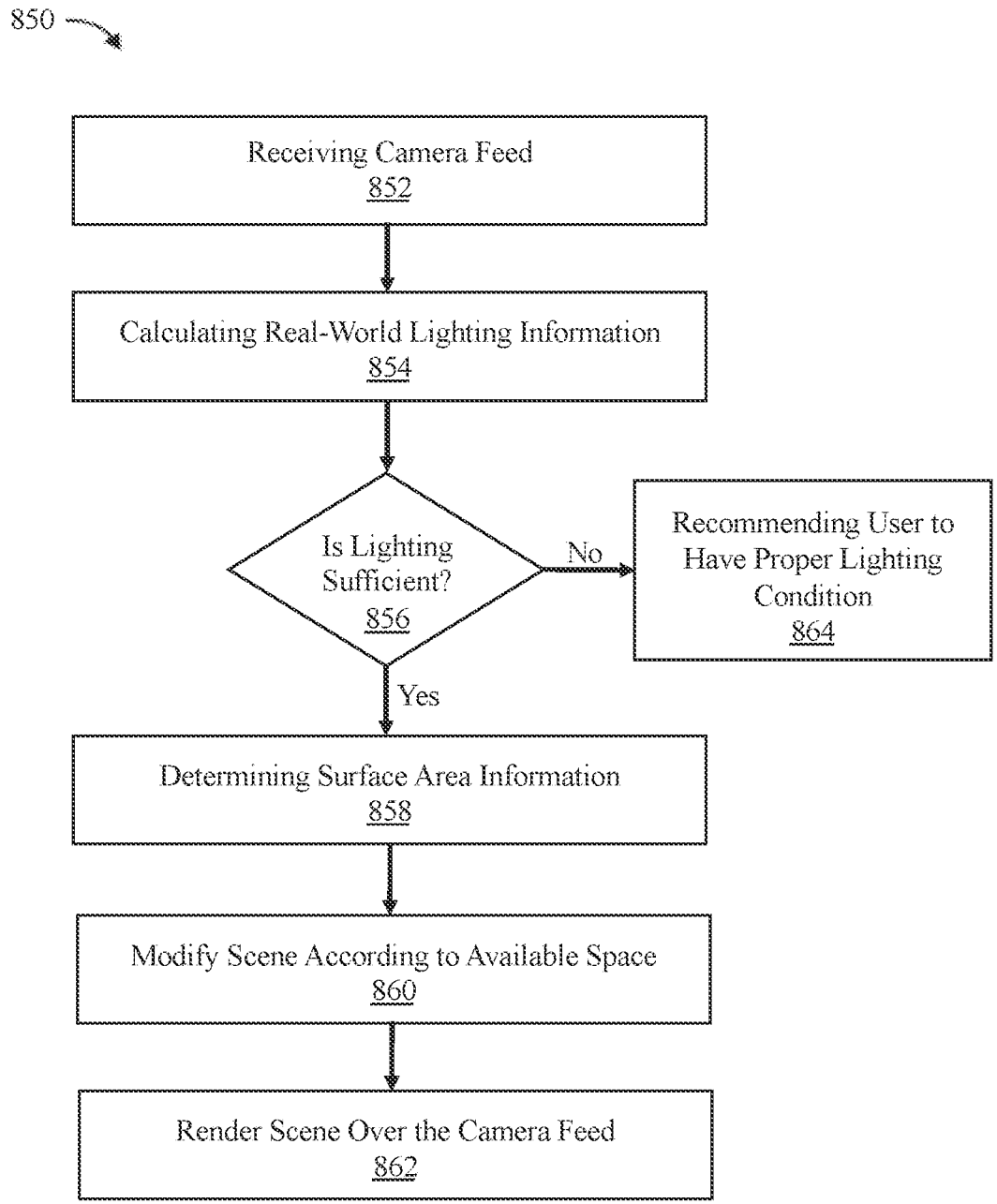

FIGS. 8A-B are a flow diagrams 800 and 850 illustrating exemplary working of the augmented reality system in accordance with an embodiment of the present disclosure.

Referring exemplary flow diagram 800, the process can be initiated at block 802, where a camera of a computing device can be initialized and at block 804, where the camera generates a camera feed to capture real world scenario on an augmented reality environment (e.g. virtual environment). At block 804, sensor data is generated from a plurality of sensors to create a 3D matrix, at block 808. At block 810, the information of the 3D matrix is saved in a textual format. At block 812, context fora virtual object is created such that based on the context at block 814, the virtual object is added to the augmented reality environment. Those skilled in the art would appreciate that each time a virtual object is selected for the augmented reality environment, a new context is created based on real world elements and already existing virtual objects. In case there is a change in hardware orientation or real-world parameters, the change is determined at block 816. Based on the determination, either a new context can be created at block 812, or if the user had already visited the changed orientation before, the system can revisit the unchanged orientation at block 818 so that context is recreated without processing at block 820.

Referring exemplary flow diagram 850, the process can be initiated at block 852 by receiving camera feed at the computing device. Based on camera feed and sensor information, at block 854, real-world lighting information can be calculated. At block 856, it can be determined whether lighting is sufficient or not. In case the lighting in not sufficient, at block 864, the system can recommend the user to have a proper lighting condition. In case the lighting is sufficient, at block 858, the system can determine surface area information. At block 860, the scene can be modified according to available space such that, at block 862, the scene can be rendered over the camera feed in the augmented reality environment.

Figure 9:
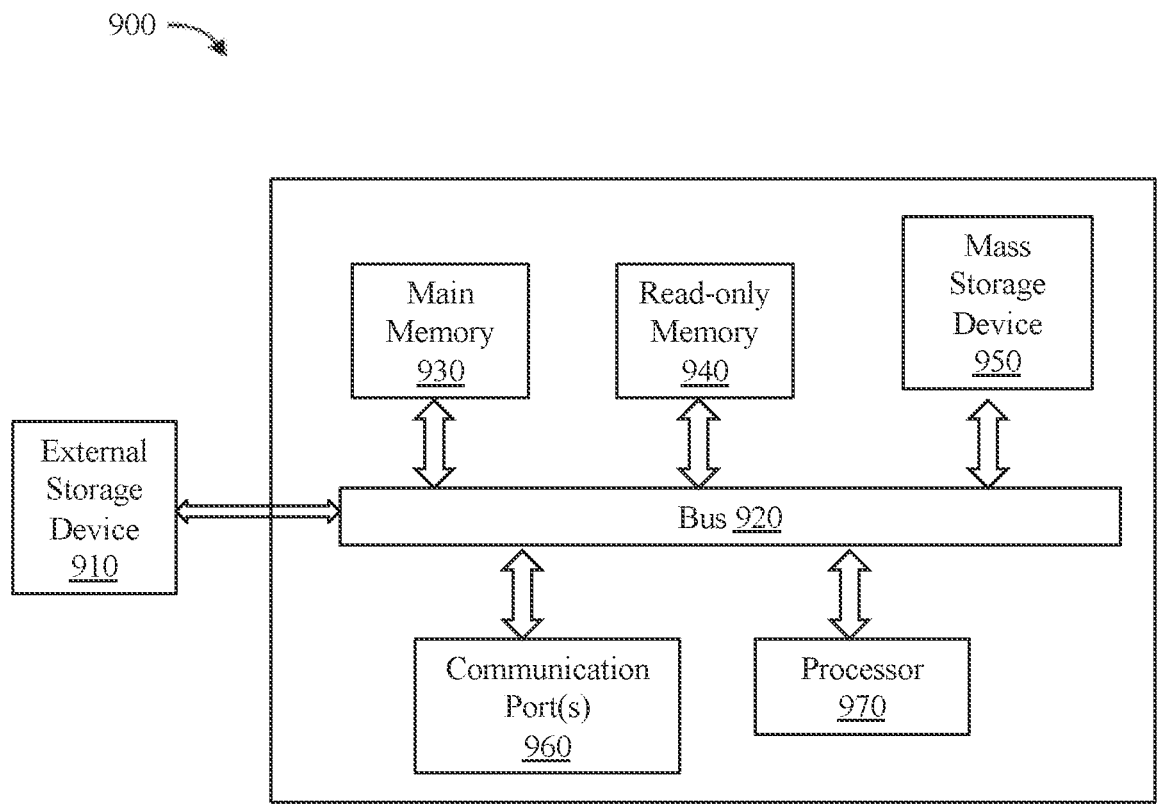
FIG. 9 illustrates an exemplary computer system in which or with which embodiments of the present disclosure can be utilized in accordance with embodiments of the present disclosure.

FIG. 9 illustrates an exemplary computer system 900 in which or with which embodiments of the present disclosure can be utilized in accordance with embodiments of the present disclosure.

As shown in FIG. 9, computer system 900 includes an external storage device 910, a bus 920, a main memory 930, a read only memory 940, a mass storage device 950, communication port 960, and a processor 970. A person skilled in the art will appreciate that computer system may include more than one processor and communication ports. Examples of processor 970 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 970 may include various engines associated with embodiments of the present invention. Communication port 960 can be any of an RS-232 port for use with a modem-based dialup connection, a 10/100 Ethernet port, a Gigabit or 10 Gigabit port using copper or fiber, a serial port, a parallel port, or other existing or future ports. Communication port 960 may be chosen depending on a network, such a Local Area Network (LAN), Wide Area Network (WAN), or any network to which computer system connects.

Memory 930 can be Random Access Memory (RAM), or any other dynamic storage device commonly known in the art. Read only memory 940 can be any static storage device(s) e.g., but not limited to, a Programmable Read Only Memory (PROM) chips for storing static information e.g., start-up or BIOS instructions for processor 970. Mass storage 950 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage and communication blocks. Bus 920 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 970 to software system.

Optionally, operator and administrative interfaces, e.g. a display, keyboard, and a cursor control device, may also be coupled to bus 920 to support direct operator interaction with computer system. Other operator and administrative interfaces can be provided through network connections connected through communication port 960. External storage device 910 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Those skilled in the art would appreciate that various embodiments disclosed herein provide systems and methods for viewing interplay between real-world elements and virtual objects of an augmented reality environment. Various embodiments render augmented reality experience faster (without any frame drop), and minimizes storage requirement, which keeps the processor free from clogging and enhances processing speed. Advantageously, the systems and methods of the present disclosure are platform-independent. Further, various embodiments represent textual data in a three-dimensional grid with plurality of cells, the information pertaining to each cell requires minimum processing inputs, which makes hardware of the system free from clogging and focuses on processing for tracking and rendering graphical elements of virtual objects. Further, as information pertaining to each cell requires minimum processing inputs, power utilization (e.g. battery utilization) of the system becomes very profound.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

The invention claimed is:

1. A system implemented in a computing device, for creating a context for a virtual object, said system comprising:
   a processing unit comprising a processor coupled with a memory;
   an input unit comprising:
      one or more sensors coupled with the computing device, wherein the one or more sensors capture one or more parameters of one or more real-world elements of an augmented reality environment;
      one or more pre-processors operatively coupled with the processing unit, wherein the one or more pre-processors perform pre-processing of raw sensed input data captured by the one or more sensors, wherein the processing unit is configured to:
      receive values of the one or more parameters from the input unit;
      create a three-dimensional textual matrix of sensor representation of a real environment world based on the one or more parameters, in real-time, wherein the processing unit create textual information that is reusable in the three-dimensional matrix; and
      create a context of a specific virtual object from one or more virtual objects with respect to the real-world environment based on the three-dimensional textual matrix, wherein the context of the specific virtual object is created based on the context of one or more other virtual objects, and wherein each virtual object is divided into a plurality of parts and subparts, and wherein to create a context of a specific virtual object, the processing unit is further configured to:
      determine factors including textures and one or more surfaces;
      analyze each data point in the real-world environment based on the determined factors; and
      place the virtual object in context based on the determined factors and analysed data points.

2. The system of claim 1, wherein the one or more parameters include information pertaining to any or a combination of light, sound, surface, size, direction of light and physics of the one or more real-world elements.

3. The system of claim 1, wherein the one or more sensors include any or a combination of an image sensor, a camera, an accelerometer, a sound sensor and a gyroscope.

4. The system of claim 1, wherein the three-dimensional textual matrix includes information pertaining to any or a combination of space estimation, light estimation, sound estimation, surface estimation, environment estimation, size estimation, direction of light estimation, and physics estimation with respect to the one or more real-world elements.

5. The system of claim 1, wherein a least count of the sensors in the computing device is defined by the following formula:

Minimum possible cell side=112*(Least count of an accelerometer)*$(1/f)$*$(1/f)$ where, f is frequency of accelerometer inputs.

6. The system of claim 1, wherein the three-dimensional grid includes a plurality of cells, and wherein information pertaining to each cell of the plurality of cells is saved in the three-dimensional textual matrix.

7. The system of claim 1, wherein said factors further includes one or more of light, sound, and geometries.

8. A method for creating a context for a virtual object, wherein the method comprises:
receiving values of one or more parameters, from an input unit;
creating via a processing unit, a three-dimensional textual matrix of sensor representation of a real environment world based on the one or more parameters, in real-time, wherein the processing unit create textual information that is reusable in the three-dimensional matrix; and
creating a context of a specific virtual object from one or more virtual objects with respect to the real-world environment based on the three-dimensional textual matrix, wherein the context of the specific virtual object is created based on the context of one or more other virtual objects, wherein each virtual object is divided into a plurality of parts and subparts, and wherein creating the context of the specific virtual object comprises:
determining factors including textures and one or more surfaces;
analysing each data point in the real-world environment based on the determined factors; and
placing the virtual object in context based on the determined factors and analysed data points.

9. The method of claim 8, wherein the three-dimensional textual matrix includes information pertaining to any or a combination of space estimation, light estimation, sound estimation, surface estimation, environment estimation, size estimation, direction of light estimation, and physics estimation with respect to the one or more real-world elements.

10. The method of claim 8, wherein each virtual object of the one or more virtual objects is divided into a plurality of parts and subparts.

11. The method of claim 8, wherein the three-dimensional grid includes a plurality of cells, and wherein information pertaining to each cell of the plurality of cells is saved in the three-dimensional textual matrix.

12. A computer program product, comprising:
a non-transitory computer readable storage medium comprising computer readable program code embodied in the medium that is executable by one or more processors of a computing device to create a context for a virtual object, wherein the one or more processors perform:
receiving values of one or more parameters, from an input unit;
creating via a processing unit, a three-dimensional textual matrix of sensor representation of a real environment world based on the one or more parameters, in real-time, wherein the processing unit create textual information that is reusable in the three-dimensional matrix; and
creating a context of a specific virtual object from one or more virtual objects with respect to the real-world environment based on the three-dimensional textual matrix, wherein the context of the specific virtual object is created based on the context of one or more other virtual objects, and wherein each virtual object is divided into a plurality of parts and subparts, and wherein to create a context of a specific virtual object, the processing unit is further configured to:
determine factors including textures and one or more surfaces;
analyse each data point in the real-world environment based on the determined factors; and
place the virtual object in context based on the determined factors and analysed data points.

13. The computer program product of claim 12, wherein the three-dimensional textual matrix includes information pertaining to any or a combination of space estimation, light estimation, sound estimation, surface estimation, environment estimation, size estimation, direction of light estimation, and physics estimation with respect to the one or more real-world elements.

14. The computer program product of claim 12, wherein the three-dimensional grid includes a plurality of cells, and wherein information pertaining to each cell of the plurality of cells is saved in the three-dimensional textual matrix.

* * * * *